Patented Apr. 1, 1947

2,418,173

UNITED STATES PATENT OFFICE 2,418,173

PRODUCTION OF DIKETONES

Vernon E. Haury, El Cerrito, and Seaver A. Ballard, Oakland, Calif., assignors to Shell Development Company, San Francisco, Calif., a corporation of Delaware No Drawing. Application July 18, 1944, Serial No. 545,536

12 Claims. (Cl. 260—586)

This invention relates to the production of diketones, and more particularly pertains to a method for the production of diketones from monoketones, which process comprises reacting a monoketone with a nitrogen-containing compound, thereby forming a nitrogen-containing monoketone derivative, reacting the said nitrogen-containing monoketone derivative with an acylating agent, thereby forming a nitrogen-containing ketone, and subsequently reacting the said nitrogen-containing ketone with a hydrolytic reagent, thereby forming a diketone. The invention relates further to a process for the production of diketones from nitrogen-containing compounds which comprises reacting a nitrogen-containing compound, e. g., a nitrogen-containing monoketone derivative, with an acylating agent, thereby forming a nitrogen-containing ketone, and then reacting the said nitrogen-containing ketone with a hydrolytic reagent to form the desired diketone.

It has been found that a wide variety of diketones which are useful as solvents and as intermediates in the synthesis of other valuable organic compounds may be produced economically and in good yields from monoketones which are relatively inexpensive and are commercially available, by a novel process which essentially comprises reacting a monoketone with a nitrogen compound wherein a trivalent nitrogen atom is attached to two hydrogen atoms, thereby forming a nitrogen-containing derivative wherein a nitrogen atom is linked through a double bond to a carbon atom which is joined through single bonds to two other carbon atoms, reacting the said nitrogen-containing derivative with an acylating agent, thereby producing a nitrogen-containing monoketone, and hydrolyzing the said nitrogen-containing monoketone to form a diketone by reacting the said nitrogen-containing monoketone with a hydrolyzing agent. The three steps in the process may be illustrated by the following equations for the preparation of isovalerylacetone from methyl isobutyl ketone, a primary amine (RNH)₂, and ketene:

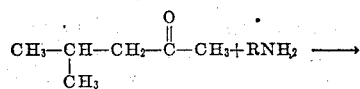

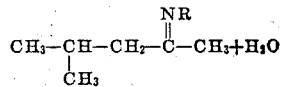

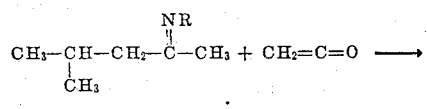

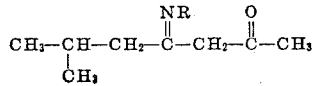

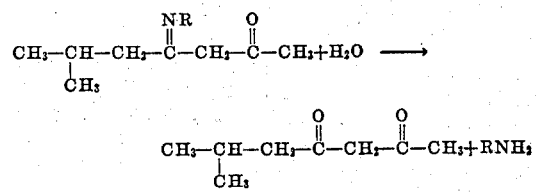

The first step in the process, i. e. the formation from a monoketone of a nitrogen-containing derivative wherein a nitrogen atom is linked through a double bond to a carbon atom which is joined through single bonds to two other carbon atoms, may be accomplished by reacting the said monoketone with a compound of the class frequently used to prepare derivatives of monoketones and to establish their identity in organic qualitative analysis. Such compounds include hydroxylamine, H₂NOH, phenyl hydrazine, H₂NNHC₆H₅, and semicarbazide, H₂NNHCONH₂. The reaction with these compounds to form ketone derivatives wherein there is a carbon atom linked through a double bond to a nitrogen atom and through single bonds to two other carbon atoms may be effected and the product isolated in the manner which is customarily used to prepare and isolate these derivatives.

It is preferred, however, for reasons of economy and efficiency of operation, to prepare nitrogen-containing compounds of the described structure, by reacting a ketone with a primary amine thereby forming an N-substituted ketimine. This condensation may be effected in any manner known to the art, as by the reaction of a primary amine with a ketone in the presence or absence of a condensing agent such as zinc chloride. Such a process is disclosed and claimed in the co-pending application, Serial No. 512,042, filed November 27, 1943. The desired result, i. e. the formation of a ketimine, may also be accomplished by the catalytic reduction of a ketone in the presence of ammonia and hydrogen, as disclosed and claimed in the co-pending application, Serial No. 522,376, filed February 14, 1944, or by the dehydrogenation of a secondary amine, as disclosed and claimed in the co-pending application, Serial No. 529,873, filed April 5, 1944. Imines prepared by these or other methods lend themselves particularly readily to the herein described synthesis, and in most cases react readily with the acylating agents to form nitrogen-containing monoketones which may be hydrolyzed to form diketones by the method outlined herein.

These and other suitable methods may be used in the preparation of a variety of nitrogen-containing compounds which may be acylated to form nitrogen-containing monoketone intermediates for the production of diketones in accordance with the process of the present invention.

Suitable nitrogen-containing compounds are, in general, those which contain a carbon atom linked through a double bond to a nitrogen atom as, for example, compounds which contain an oxime group,

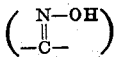

a phenyl hydrazone group

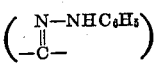

or a semicarbazone group

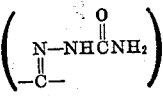

The organic imines comprise a preferred class of starting materials, however, since they are in many cases comparatively inexpensive and procurable on a commercial scale. The imino group may be either unsubstituted as in compounds containing the grouping

or substituted with a hydrocarbon radical as in compounds which contain the grouping

wherein R is a hydrocarbon radical. A variety of hydrocarbon radicals may be substituted upon the nitrogen atom of the imino group. The said radical may be, for example, an alkyl radical. The hydrocarbon radical which is substituted upon the nitrogen atom of the imino group may be an alkyl radical, an alkenyl radical, a cycloalkyl radical, a cycloalkenyl radical or an aromatic radical. Suitable alkyl radicals include the methyl, ethyl, n-propyl, isopropyl, n-butyl, sec-butyl, isobutyl, amyl, hexyl, heptyl, octyl, nonyl, decyl, undecyl, dodecyl, pentadecyl, heptadecyl and octadecyl radicals and the like. Examples of cycloalkyl or alicyclic radicals which may be substituted upon the nitrogen atom are the cyclopentyl and cyclohexyl radicals and the alkyl derivatives of these radicals. Suitable unsaturated groups include the ethylene, propylene, butylene, isobutylene, octylene, decylene, octadecylene, cyclopentenyl, methyl cyclopentenyl, cyclohexenyl and methyl cyclohexenyl groups. A wide variety of aromatic radicals may also be present as substituent groups upon the imino nitrogen atom. Suitable aromatic groups include the phenyl, tolyl, xylyl, naphthyl, alkyl naphthyl, and phenanthryl and the like. These and similar radicals may be substituted with non-interfering functional groups, i. e., groups which will not interfere with the reaction by inducing the occurrence of undesirable side reactions, such as the halogen, ether, tertiary amino, keto, ester and carboxyl groups.

Numerous different types of chemical groups or radicals may also be attached to the carbon atom which is joined through a double bond to a nitrogen atom provided the resulting compound contains at least one hydrogen-bearing carbon atom which is reactive toward an acylating agent. If this condition is fulfilled one of the said groups may be, for example, an aryl group. Suitable aryl groups which may be substituted upon the nitrogen-bearing carbon atom include the phenyl, tolyl, xylyl, naphthyl, alkyl naphthyl and phenanthryl groups.

One or both of the groups attached to the nitrogen-bearing carbon atom may be an alicyclic group, provided again that there is at least one replaceable hydrogen atom on a carbon atom of the resulting compound. Thus, one or both of the said groups may be a cyclohexyl, methylcyclohexyl, cyclopentyl or alkylcyclopentyl group. The alicyclic group may also be unsaturated, i. e., it may be a cycloalkenyl group such as the cyclohexenyl or cyclopentenyl group or the alkyl derivatives of these groups.

Similarly, the groups which are attached to the nitrogen-bearing carbon atom may be alkyl groups or alkenyl groups, at least one of which contains an acylatable carbon group. The alkyl groups or alkenyl groups may be either straight chain or branched chain and may contain non-interfering substituent groups such as the halogen, ether or keto groups. Examples of suitable alkyl groups are the methyl, ethyl, isopropyl, n-propyl, n-butyl, sec-butyl, tert-butyl, n-amyl, isoamyl, sec-amyl, tert-amyl, neopentyl, hexyl, heptyl, octyl, nonyl, decyl, undecyl, dodecyl, pentadecyl, heptadecyl and octadecyl groups, while representative alkenyl radicals are the ethylene, propylene, butylene, isobutylene, amylene, isoamylene, hexylene, octylene and octadecylene radicals.

Another class of nitrogen-containing compounds which may be acylated in accordance with the herein disclosed process comprises those homocyclic and heterocyclic compounds wherein a nuclear or non-nuclear nitrogen atom is attached through a double bond to a nuclear carbon atom and wherein there is at least one carbon atom, preferably the carbon atom adjacent to the nitrogen-bearing carbon atom, which is linked to a replaceable hydrogen atom. Such compounds may be, for example, the oximes, the phenyl hydrazones, semicarbazones and substituted or unsubstituted imines derived from cyclopentanone, the alkyl cyclopentanones, cyclohexanone and the suitable alkyl-substituted cyclohexanones.

A variety of acylating agents may be used for effecting the second step of the herein described process for the production of diketones from monoketones, i. e., the introduction of an acyl group into the molecular structure of an organic compound containing a carbon atom joined through a double bond to a nitrogen atom and thus forming a nitrogen-containing ketone. In the case of compounds in which the hydrogen atom which is attached to the acylatable carbon atom is especially active and readily replaceable, relatively weak acylating agents such as the free organic acids (RCOOH) or their esters (RCOOR') may be used. When using an ester as an acylating agent it may be desirable or necessary in some cases to also employ a condensing agent such as sodium ethylate to expedite the acylation process. In most cases, however, it is desirable in order to obtain high yields of nitrogen-containing ketones and rapid reaction rates to use more active acylating agents such as the acid anhydrides, acid chlorides, acid bromides or the ketones. When a nitrogen-containing compound of the class described is treated with an acid anhydride, a nitrogen-containing ketone is formed together with an equivalent amount of a free organic acid in accordance with the following representation:

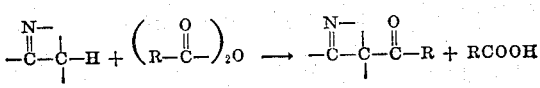

Acid anhydrides which may be employed as acylating agents include acetic anhydride, propionic anhydride, butyric anhydride, valeric anhydride, acrylic anhydride, crotonic anhydride, caproic anhydride, caprylic anhydride, capric anhydride, phthalic anhydride, maleic anhydride and the like.

When using an acid chloride or an acid bromide as an acylating agent, however, a free halogen hydride, i. e., hydrogen chloride or hydrogen bromide, is formed together with the nitrogen-containing ketone:

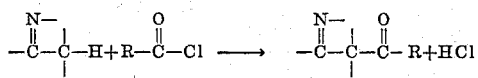

Suitable acid halides for use as acylating agents include acetyl chloride, propionyl chloride, butyryl chloride, isobutyryl chloride, valeryl chloride, capryl chloride, capric chloride, caprylic chloride, stearyl chloride, acrylyl chloride, crotonyl chloride, acetyl bromide, propionyl bromide, butyryl bromide, isobutyryl bromide, valeryl bromide, capryl bromide, capric bromide, caprylic bromide, stearyl bromide, acrylyl bromide, crotonyl bromide, and the like.

These two reactions, i. e., the reaction of a nitrogen-containing compound containing an acylatable carbon atom with an acid halide or with an acid anhydride may be promoted in some cases by the addition of a suitable catalyst such as aluminum chloride, boron trifluoride, etc.

The process of the invention is particularly well adapted to the use of nitrogen-containing monoketones prepared by the acetylation of the presently described class of nitrogen-containing compounds, i. e., of compounds prepared by the introduction of the acetyl group

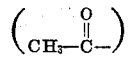

into the molecular structure of the said compounds. In this case nitrogen-containing ketones are formed in which there is a methyl group attached to the carbon atom of the carbonyl group so that the compounds may contain the grouping:

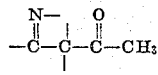

The acetylation process may be carried out through the agency of the aforementioned acetylating reagents, i. e., acetyl chloride, acetyl bromide or acetic anhydride. It is often preferred to use ketene ($CH_2=C=O$) as an acetylating agent, however, since its use is economical, simple and attended by the formation of unusually high yields of a relatively pure product. The use of ketene also obviates the necessity of separating acetic acid or a halogen acid from the reaction mixture and from the product as is necessary when using acetic anhydride or an acetyl halide. When ketene is used as an acetylating agent the reaction may be represented as follows:

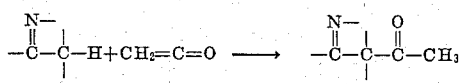

The relative amounts of nitrogen-containing organic compound and acylating or acetylating agent to be used in order to execute the process of the invention with maximum effectiveness should be such as to provide at least one equivalent of reagent for each hydrogen atom which it is desired to replace with an acyl group, it being preferred in many cases to use a slight excess of acylating agent over and above this amount. Thus, where it is desired to introduce but a single acyl group, it is preferred to use about 1.25 equivalents of an acylating agent such as acetic anhydride for each equivalent of organic compound. However, when it is desired to introduce more than one acyl group, as in the case of a compound which contains a replaceable hydrogen atom on a nitrogen atom or oxygen atom as well as a replaceable hydrogen atom on a

group, it may be necessary to increase this ratio to about 1 equivalent of starting material to about 2.5 equivalents of acylating agent, since each equivalent of such a compound will react with one equivalent of the acylating agent to form an N-acyl derivative as well as with a second equivalent of acylating agent to further acylate the imine molecule by the replacement of the hydrogen atom of the

group.

The hydrogen atom which is attached to the acylatable carbon atom in compounds of the class described is usually sufficiently reactive so that no catalyst need be employed to effect the desired reaction. However, if desirable or necessary in certain cases a catalyst may be used to accelerate the process, suitable catalysts being, for example, aluminum chloride or boron trifluoride. These may be used in any amounts as required to secure the desired conversion.

The temperature at which the reaction is carried out may likewise be varied as required by the nature of the reacting substances. When the nitrogen compound which is being acylated contains an especially active hydrogen, i. e., one which is particularly easily replaced by an acyl group, and when a particularly active acylating agent is employed, the temperature required will be lower than when the converse is true. When an acid anhydride is being employed as an acetylating agent, it is preferred in most cases to employ temperatures which are sufficiently high to vaporize the acid formed during the course of the reaction and to effect its separation from the reaction mixture substantially as soon as it is formed. Thus, when a nitrogen compound is being acetylated with acetic anhydride at atmospheric pressure, it is preferred to operate at a temperature which is slightly above the boiling temperature of acetic acid, i. e., a temperature of above about 118° C.

In most cases the acylation may be effectively carried out at atmospheric pressure. However, subatmospheric or superatmospheric pressures may be employed if desirable or necessary. It may in some instances be desirable to employ subatmospheric pressures to insure thorough removal of any organic acid which may be present in the reaction mixture.

Although the reaction between the nitrogen compound and the acylating agent may usually be carried out without the addition of a third substance, it may, in some cases, be advantageous to carry out the reaction in the presence of a mutual solvent. This may inhibit the reaction to some degree and cause it to take place more smoothly and without the formation of undesirable by-products. Suitable solvents are, for example, benzene, toluene, hexane, iso-octane, methyl isobutyl ketone and pyridine.

The nitrogen-containing ketone may in most cases be satisfactorily separated from any unreacted starting materials and from any undesirable by-products which may be present in the reaction mixture by fractional distillation. Where the product is high-boiling it may be desirable to effect the separation under reduced pressure.

The acylation may be carried out in a continuous, intermittent or batch manner. When operating in a continuous manner the reactants, i. e., the nitrogen compound and the acylating agent, may be continuously introduced into a suitable reaction chamber and the products of the reaction continuously withdrawn therefrom.

The position taken by the entering acyl group in the molecular structure of the nitrogen-containing starting material will obviously be determined by the position of the carbon atom which is reactive toward an acylating agent, i. e., the acylatable carbon atom. Although this carbon atom may be in any position relative to the carbon atom which is joined through a double bond to a nitrogen atom, it is usually adjacent thereto since the

group appears to have an activating influence on the adjacent or alpha carbon atom. Thus, a hydrogen atom located on a carbon atom which is next to the said carbon-nitrogen group, as in a compound which contains the grouping

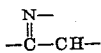

is particularly easily replaced, the acylation reaction in this case leading to the formation of a nitrogen-containing ketone wherein the carbon-nitrogen group is in the beta position to the carbonyl group, as in the case of compounds containing the grouping

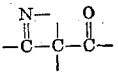

A particularly desirable class of compounds containing an acylatable carbon atom adjacent to a carbon atom which is linked through a double bond to a nitrogen atom comprises those compounds wherein there is a methyl group attached to the carbon atom of the said carbon-nitrogen group. Acylation of such a compound, i. e., one containing the grouping

leads to the formation of a nitrogen-containing ketone wherein the carbon-nitrogen group is separated by a methylene group from the carbonyl group, thus:

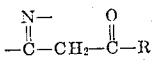

It will be apparent that in some cases there may be more than one acylatable carbon atom within the molecular structure of the nitrogen-containing starting material. In such a case the acyl group may be substituted upon two or more carbon atoms, thus resulting in the formation of a mixture of isomeric nitrogen-containing ketones. When there is more than one acylatable carbon atom and when an excess of an acylating agent is used, the result may be that more than one acyl group may be substituted upon the said acylatable carbon atoms. Thus, mono-, di-, tri- and/or poly-acyl derivatives or mixtures of the same may result from the acylation of a single compound. The course of the reaction and the number of substituting acyl groups may be controlled, however, by controlling the relative amounts of the reactants employed, the operating conditions, etc., as is more fully described hereinbelow.

Certain of the above-named types of compounds, i. e., the oximes, phenyl hydrazones, semicarbazones and imines which do not contain a hydrocarbon radical substituted upon the nitrogen atom of the imino group also contain a hydrogen atom on a nitrogen atom or on an oxygen atom. Such a hydrogen atom is especially reactive toward acylating agents. In the case of these compounds the acylation process usually proceeds in such a manner as to introduce an acyl group upon the nitrogen atom or oxygen atom as well as an acyl group on a carbon atom. The replacement of the active hydrogen on the nitrogen atom or oxygen atom occurs more readily than does the replacement of the hydrogen atom on the acylatable carbon atom and is therefore probably the first reaction occurring when an acylating agent is added to a nitrogen-containing compound of the class herein described. However, if an excess of acylating agent is used and if suitable reaction conditions are maintained, the reaction may be controlled so as to effect the introduction of a second acyl group and the formation of the desired nitrogen-containing ketone. The reaction in these cases leads to the formation of a different class of nitrogen-containing ketones, i. e., compounds wherein the oxime, phenyl hydrazone, semicarbazone or imino groups have also been acylated. In the case of the oximes, the product may be an oxime acylate, e. g., an oxime acetate, which contains the group

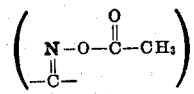

while in the case of the acylated phenyl hydrazones, semicarbazones and imines, the products may be the N-acyl (e. g., N-acetyl) derivatives having structural groups which may be represented, respectively, as follows:

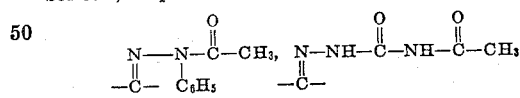

and

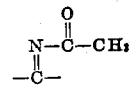

In some cases, however, nitrogen-containing heterocyclic products may be formed.

The nitrogen-containing monoketone produced by the acylation of a nitrogen-containing compound wherein a carbon atom is attached through a double bond to a nitrogen atom and through single bonds to two other carbon atoms may be converted to the desired diketone by hydrolysis of the carbon-to-nitrogen double bond by reaction with a hydrolyzing agent. The hydrolytic reagent employed in converting the nitrogen-containing ketone to the diketone of corresponding structure may comprise water itself or aqueous solutions of acidic or basic substances. It is preferred in most cases, however, to use acidic hydrolytic agents for effecting the conversion of nitrogen-containing ketones to diketones. A wide variety of acidic reagents may be used for this purpose. Such acidic reagents as aqueous solutions of the inorganic acids including sulfuric acid, hydrochloric acid, hydrobromic acid, nitric acid, phosphoric acid, phosphorous acid, sulfurous acid and organic acids such as formic acid, chloracetic acid, acetic acid and propionic acid, may be satisfactorily employed. These may preferably be used in the form of their aqueous solutions containing a 10% to 20% excess of acid over that amount required to combine with the ammonia, primary amine or other basic compound which may be a product of the hydrolytic reaction.

If desired, a solvent may be used to cause the formation of a uniform solution comprising the nitrogen-containing ketone, e. g. the imino-ketone, the aqueous hydrolytic reagent and the solvent, thereby effecting a more rapid conversion of the nitrogen-containing ketone to diketone. Any solvent in which both the ketone and the hydrolytic reagent are soluble may be used. Suitable solvents are, for example, methyl alcohol, ethyl alcohol, propyl alcohol, isopropyl alcohol, acetone and dioxan. These may be employed as required to effect the formation of a single phase reaction mixture.

Although the hydrolytic process may be carried out at relatively low temperatures, e. g., temperatures of from about 25° C. to about 50° C., the hydrolysis takes place more rapidly at higher temperatures. It may therefore be advantageously carried out at a temperature which is approximately the boiling or reflux temperature of the reaction mixture. When dilute aqueous soultions of hydrolytic reagents are used this temperature may be from about 100° C. to about 105° C.

The hydrolysis normally takes place at a satisfactory rate when carried out at atmospheric pressure. However, subatmospheric or superatmospheric pressures may be employed if desirable or necessary.

If a mutual solvent is not employed to insure the formation of a single phase reaction mixture or if thorough mixing of the nitrogen-containing ketone with the hydrolytic reagent is not effected by boiling the reaction mixture, it is usually desirable to provide means for thoroughly mixing the constituents thereof. This may be accomplished, for example, by stirring or shaking the reaction mixture, or by passing a stream of an inert gas therethrough, while the hydrolytic reaction is taking place.

The diketone product may be separated from the reaction mixture by distillation or other suitable means. A preferred procedure comprises passing steam through the reaction mixture thereby separating the diketone, which is present as an insoluble oil, from any basic substances such as ammonia or primary amines which may be present in the reaction mixture and which will remain in solution in the aqueous acid phase as an amine salt. After removing the diketone by the steam distillation process, it may be separated from the water formed by condensation of the steam and further purified by distilling it at atmospheric or at subatmospheric pressure.

Although the hydrolytic step may be carried out using as a starting material a quantity of nitrogen-containing monoketone which has been isolated from the reaction mixture and which may have been freed from contaminating substances such as unreacted starting materials or undesirable by-products of the reaction by distillation or other suitable methods, it may often be preferable to add the hydrolyzing agent directly to the reaction mixture resulting from the acylation of a nitrogen-containing compound of suitable structure, thereby effecting the hydrolysis of the nitrogen-containing monoketone in the presence of the other constituents of the said reaction mixture, which will not ordinarily interfere with the hydrolytic reaction. The diketone product may then be separated from the reaction mixture by any desired method, as by distillation, blowing with steam, etc.

One method of preparing diketones from monoketones in accordance with the presently described process may be illustrated by that which may be employed in preparing isovaleryl acetone from methyl isobutyl ketone. In accordance with this method methyl isobutyl ketone may be reacted with a primary amine, e. g., 1,3-dimethylbutylamine, at an elevated temperature, preferably removing water from the reaction mixture as it is formed. The N-(1,3-dimethylbutyl)-methyl isobutyl ketimine prepared in this fashion may be contacted at a reaction temperature with an acetylating agent, i. e., acetic anhydride, the acetic acid formed during the course of the reaction being preferably removed from the reaction mixture substantially as soon as it is formed. This may be accomplished, for example, by carrying out the acetylation reaction at a temperature which is above the boiling temperature of acetic acid and distilling the said acetic acid from the reaction mixture as it is formed. When the reaction is complete, as may be indicated by the failure of a further quantity of acetic acid to separate from the reaction mixture, the imino-ketone product (i. e., N-(1,3-dimethylbutyl) acetylmethyl isobutyl ketimine) may be separated from the reaction mixture in any desired manner, as by fractional distillation. The imino-ketone resulting from this step may then be hydrolyzed to form a diketone (i. e., 6-methyl-2,4-heptandione) by contacting it with a 10% solution of sulfuric acid, and maintaining the resulting mixture at the boiling temperature until the hydrolysis is substantially complete, as indicated by the failure of a further quantity of insoluble oil to separate. The insoluble oil may be separated from the aqueous hydrolytic medium and distilled, thereby isolating the desired diketone product.

Another method for preparing diketones from monoketones by the presently described process is represented by that which may be used in the preparation of acetylacetone from acetone. In this embodiment a quantity of acetone may be reacted with a mineral acid salt of hydroxylamine, e. g., hydroxylamine hydrochloride, in the presence of an amount of a basic substance, e. g., sodium carbonate, which is substantially equivalent to the acid content of the hydroxylamine salt, thereby forming acetone oxime. The acetone oxime prepared in this manner may then be treated with acetyl chloride, the hydrogen chloride which is formed during the course of the reaction being allowed to escape from the reaction chamber. When the reaction is complete the reaction mixture may be distilled to separate the resulting acetylacetone mono oxime acetate from any unreacted starting material as well as from any undesirable by-products. Hydrolysis of the acetylacetone mono oxime acetate to form acetylacetone may then be effected by boiling the said acetate with a 5% to 15% excess of dilute sulfuric acid. After the reaction is complete, the reaction mixture may be subjected to steam distillation to separate the diketone product therefrom. The acetylacetone may then be separated from the water formed by condensation of the steam during the steam distillation step and purified by distillation.

Another and preferred embodiment is represented by the following procedure in which ketene is used as an acetylating agent. In accordance with this procedure a ketimine, e. g., N-(1,3-dimethylbutyl) methyl ethyl ketimine, may be prepared by the reaction of a ketone with a primary amine. The said imine may then be placed in a suitable reaction vessel equipped with means for stirring or otherwise agitating the contents and contacted with an approximately equimolecular quantity of gaseous ketene added at such a rate that the temperature of the reaction mixture remains below about 60° C. If the mixture tends to overheat because of the exothermic nature of the reaction, it may be cooled by any suitable means to the desired or optimum temperature. When the desired amount of ketene has been added, the product, e. g., the N-(1,3-dimethylbutyl) acetylmethyl ethyl ketimine and/or N-(1,3-dimethylbutyl) alpha-acetylethyl methyl ketimine, may be separated from the other constituents of the reaction mixture by any suitable method, as by distillation. It may then be converted to the diketones of corresponding structure, e., g., 2,4-hexandione and/or 3-methyl-2,4-pentandione, by hydrolysis with either an acidic or a basic hydrolytic reagent, substantially as described hereinabove.

In still another preferred embodiment of the invention in which a diketone is prepared from a monoketone by forming from the said monoketone a nitrogen-containing compound wherein a carbon atom is attached to a nitrogen atom through a double bond and to two other carbon atoms through single valence bonds, acylating the said nitrogen-containing compound and subsequently hydrolyzing the nitrogen-containing monoketone product of the acylation step without first isolating the said nitrogen-containing monoketone in a pure state from the acylation reaction mixture, a monoketone may be reacted with a primary amine, thereby forming an imine. The said imine may then be reacted with acetic anhydride in the approximate ratio of about one molar equivalent of imine to 1.1 equivalents of acetic anhydride, heated under reduced pressure, the acetic acid which is a product of the reaction being preferably distilled from the reaction mixture as it is formed. When the reaction is complete, excess dilute sulfuric acid may be added to the total product and the resulting mixture heated to effect the conversion of the iminoketone to diketone. The diketone which separates as an acid-insoluble oil may be separated from the other constituents of the reaction mixture in the aqueous acid phase, by steam distillation. It may then be purified in any suitable manner as by fractional distillation.

It will be apparent that the herein described process for the production of diketones may also be extended to include a method for the production of diketones from any type of suitable nitrogen-containing compounds wherein a carbon atom is attached through a double bond to a trivalent nitrogen atom and through single bonds to other carbon atoms, regardless of the manner of preparation of the said nitrogen-containing compound. The latter need not necessarily be prepared, therefore, from a monoketone as described hereinabove. When using a nitrogen-containing compound of the described structure as a starting material for the synthesis the process for the production of diketones becomes a two-step process comprising the acylation of the said nitrogen-containing compound to form a nitrogen-containing monoketone followed by hydrolysis of the said nitrogen containing monoketone to form the desired diketone. These reactions may be illustrated by the following equations for the preparation of isovaleryl acetone from a N-alkyl (R) substituted ketimine:

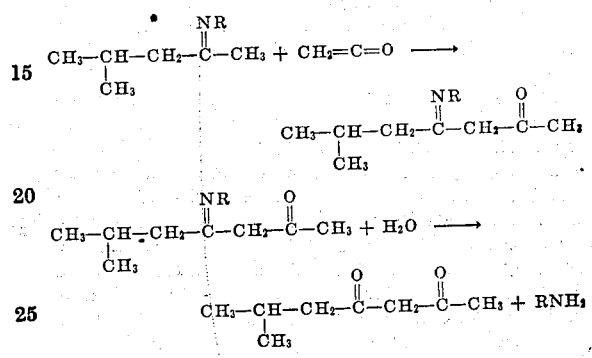

The two steps in the process may be carried out using substantially the same reagents, operating procedure and conditions of reaction as are outlined hereinabove for the second and third steps of the presently described method for the preparation of diketones from monoketones. Thus, the nitrogen-containing compounds wherein a carbon atom is attached through a double bond to a nitrogen atom and through single bonds to two other carbon atoms may be acylated using such acylating agents as the acid anhydrides, the acid halides and the ketenes to form a nitrogen-containing monoketone which may then be hydrolyzed to the desired diketone by reaction with water itself or with aqueous solutions of acidic or basic substances.

Thus, one method of preparing diketones in accordance with the presently described process may be illustrated by that which may be employed to advantage in preparing isovalerylacetone from N-(1,3-dimethylbutyl) methyl isobutyl ketimine, using acetic anhydride as an acetylating agent. In this embodiment, N-(1,3-dimethylbutyl) methyl isobutyl ketimine may be contacted at a reaction temperature with an acetylating agent, i. e., acetic anhydride, the acetic acid formed during the course of the reaction being preferably removed from the reaction mixture substantially as soon as it is formed. This may be accomplished, for example, by carrying out the acetylation reaction at a temperature which is above the boiling temperature of acetic acid and distilling the said acetic acid from the reaction mixture as it is formed. When the reaction is complete, as may be indicated by the failure of a further quantity of acetic acid to separate from the reaction mixture, the iminoketone product (i. e., N-(1,3-dimethylbutyl) acetylmethyl isobutyl ketimine) may be separated from the reaction mixture in any desired manner, as by fractional distillation. The iminoketone resulting from this step may then be hydrolyzed to form a diketone (i. e., 6-methyl-2,4-heptandione) by contacting it with a 10% solution of sulfuric acid, and maintaining the resulting mixture at the boiling temperature until the hydrolysis is substantially complete, as indicated by the failure of a further quantity of insoluble oil to separate. The insoluble oil may be separated from the aqueous hydrolytic medium and distilled, thereby isolating the desired diketone product.

Another method for preparing diketones by the presently described process is represented by that which may be used in the acetylation of acetone oxime with acetyl chloride and in the hydrolysis of the resulting product. In this embodiment acetone oxime may be treated with acetyl chloride, the hydrogen chloride which is formed during the course of the reaction being allowed to escape from the reaction chamber. When the reaction is complete the reaction mixture may be distilled to separate the resulting acetylacetone mono oxime acetate from any unreacted starting material as well as from any undesirable by-products. Hydrolysis of the acetylacetone mono oxime acetate to form acetylacetone may then be effected by boiling the said acetate with a 5% to 15% excess of dilute sulfuric acid. After the reaction is complete, the reaction mixture may be subjected to steam distillation to separate the diketone product therefrom. The acetylacetone may then be separated from the water formed by condensation of the steam during the steam distillation step and purified by distillation.

Another and preferred embodiment in which ketene is used as the acetylating agent is represented by the following. A quantity of an imine, e. g., N-(1,3-dimethylbutyl) methyl ethyl ketimine, contained in a suitable reaction vessel equipped with means for stirring or otherwise agitating the contents may be contacted with an approximately equimolecular quantity of gaseous ketene added at such a rate that the temperature of the reaction mixture remains below about 60° C. If the mixture tends to overheat because of the exothermic nature of the reaction, it may be cooled by any suitable means to the desired or optimum temperature. When the desired amount of ketene has been added, the product, e. g., the N-(1,3-dimethylbutyl) acetylmethyl ethyl ketimine and/or N-(1,3-dimethylbutyl) alpha-acetylethyl methyl ketimine, may be separated from the other constituents of the reaction mixture by any suitable method, as by distillation. It may then be converted to the diketones of corresponding structure, e. g., 2,4-hexanedione and/or 3-methyl-2,4-pentanedione, by hydrolysis with either an acidic or a basic hydrolytic reagent, substantially as described hereinabove.

In still another preferred embodiment of the invention, in which a diketone is prepared from a nitrogen-containing compound by acylation of the latter and subsequent hydrolysis of the nitrogen-containing monoketone product without isolating the said nitrogen-containing monoketone product from the acylation reaction mixture before effecting the hydrolytic step, a mixture of an imine containing an acylatable

group and acetic anhydride in the approximate ratio of about one molar equivalent of imine to 1.1 equivalents of acetic anhydride may be heated under reduced pressure, the acetic acid which is a product of the reaction being preferably distilled from the reaction mixture as it is formed. When the reaction is complete, excess dilute sulfuric acid may be added to the total product and the resulting mixture heated to effect the conversion of the imino-ketone to diketone. The diketone which separates as an acid-insoluble oil may be separated from the other constituents of the reaction mixture, especially from the primary amine sulfate which remains in solution in the aqueous acid phase, by steam distillation. It may then be purified in any suitable manner as by fractional distillation.

The following examples illustrate the process of the invention for the preparation of diketones.

*Example I*

A mixture of 10 parts of methyl isobutyl ketone, 10 parts of 1,3-dimethylbutylamine and 5 parts of benzene was heated in a still equipped with a phase separating head. The water formed by the reaction of the ketone with the amine was distilled with benzene and withdrawn. The product was distilled at reduced pressure and yielded 18 parts of N-(1,3-dimethylbutyl) methyl isobutyl ketimine distilling at 110° C. at 50 mm. of mercury. Ten parts of this ketimine were heated with 7 parts of acetic anhydride at 140° C. to 180° C. distilling acetic acid as formed. Eleven parts of the nitrogen-containing monoketone, N-(1,3-dimethylbutyl) acetylmethyl isobutyl ketimine distilling at 130° C. to 135° C. at 10 mm. of mercury were obtained. This product was heated with a molar excess of 2 N sulfuric acid. While distilling the acid insoluble oil with steam, a yield of 6.0 parts of isovaleryl acetone was obtained.

*Example II*

Ten parts of aniline was heated in a still with 15 parts of methyl isobutyl ketone and 0.25 part of zinc chloride catalyst, distilling water as formed by the reaction. Eleven parts of N-phenyl methyl isobutyl ketimine were distilled at 103° C. to 104° C. at 10 mm. of mercury. Ketene was added to this ketimine at a temperature of 5° C. to 10° C. to yield a nitrogen-containing monoketone which was hydrolyzed by heating with dilute sulfuric acid to yield isovalerylacetone.

*Example III*

A mixture of 10 parts diisobutyl ketone, 6 parts 1,3-dimethylbutylamine, 3 parts benzene and 0.2 part of zinc chloride was heated, distilling water as formed by the reaction. The N-(1,3-dimethylbutyl) diisobutyl ketimine product (11 parts) distilled at 140° C. to 142° C. at 50 mm. of mercury. Ketene was added to this ketimine, the temperature of the reaction mixture being maintained at 40° C. to 45° C. by the exothermic nature of the reaction. Dilute sulfuric acid was added to the crude product and the acid insoluble oil was distilled with steam yielding 5 parts of 1-acetylisobutyl isobutyl ketone (3-isopropyl-6-methyl-2,4-heptanedione). The product has the following properties:

Boiling point_____ 107° C.–108° C. at 20 mm. of mercury
Density 20/4_____ 0.901
Refractive index 20/D_____ 1.438

*Example IV*

N-(1,3-dimethylbutyl) acetophenonimine distilling at 122° C. to 124° C. at 10 mm. of mercury was prepared in 95% yield by reacting acetophenone with 1,3-dimethylbutylamine. Ten parts of the ketimine was reacted with ketene at 5° C. The crude product was refluxed with dilute sulfuric acid and extracted with benzene.

Three parts of benzoylacetone were obtained by distillation of the benzene solution.

*Example V*

To a solution of 10 parts of N-(1,3-dimethylbutyl) acetophenonimine, prepared from acetophenone as in Example IV, in 6 parts of pyridine was added 7 parts of benzoyl chloride keeping the temperature at 50° C. to 60° C. The mixture was then heated one hour at 95° C. The product was taken up in benzene and washed with water to remove pyridine hydrochloride and then hydrolyzed by refluxing with dilute sulfuric acid. Distillation of the acid insoluble fraction yielded 2.5 parts of product distilling at 165° C. to 170° C. at 3 mm. of mercury. The dibenzoylmethane thus obtained when recrystallized from ether melted at 77° C. to 78° C. and gave a copper salt melting at 295° C. to 305° C.

*Example VI*

N-(1,3-dimethylbutyl) acetonimine distilling at 148° C. to 150° C. at atmospheric pressure was prepared by reacting acetone with 1,3-dimethylbutylamine. Ketene was added to 10 parts of the ketimine at 50° C. An excess of 2 N sulfuric acid was added to the crude product. Acetone formed by hydrolysis of unreacted ketimine and acetylacetone formed by hydrolysis of the acetylated ketimine were distilled from the acid solution. Four parts of acetylacetone were obtained.

*Example VII*

A mixture of 10 parts of cyclohexanone, 10 parts of cyclohexylamine and 5 parts of benzene was heated at 110° C. to 160° C. distilling water as formed. Fifteen parts of N-cyclohexylcyclohexanonimine were distilled from the product at 135° C. to 137° C. at 20 mm. of mercury. Ten parts of the ketimine was reacted with ketene at 30° C. to 50° C. The product was refluxed with dilute aqueous sulfuric acid to hydrolyze the acetyl ketimine yielding 3 parts of 2-acetylcyclohexanone.

*Example VIII*

Ketene was added to 500 parts of N-(1,3-dimethylbutyl) methyl isobutyl ketimine for 10 hours from a generator producing 0.35 mole of ketene per hour. The reaction mixture was kept at 50° C. to 55° C. by the heat liberated by the exothermic reaction. The total reaction product was heated with 900 parts of 3.5 N sulfuric acid. The acid insoluble oil was separated and distilled yielding 280 parts of the diketone distilling at 97° C. to 100° C. at 50 mm. This represents a 75% yield. Isovalerylacetone was identified by its copper salt melting at 154° C. to 155° C.

The presently disclosed process thus provides a practical and efficient method for the production of a wide variety of hitherto commercially unavailable diketones which are useful as solvents, in the production of other useful organic compounds, and for a variety of other purposes. The process as described enables use of either nitrogen-containing compounds wherein a carbon atom is attached through a double bond to a nitrogen atom and through single bonds to two other carbon atoms, or of monoketones as raw materials for the synthesis of diketones. It is of particular interest and significance that the latter type of compounds, i. e., the monoketones, may be used as starting materials, since many monoketones are relatively inexpensive and are readily available on a commercial scale, thus furnishing a particular abundant and practical source of raw materials for the production of valuable diketones.

We claim as our invention:

1. A process for the production of acetylacetone which comprises reacting acetone with 1,3-dimethylbutylamine, thereby forming N-(1,3-dimethylbutyl) acetonimine, contacting the said N-(1,3-dimethylbutyl) acetonimine with ketene at a temperature of between about 0° C. and about 60° C., thereby forming N-(1,3-dimethylbutyl) methyl acetylmethyl ketimine, and hydrolyzing the said N-(1,3-dimethylbutyl) methyl acetylmethyl ketimine by reaction with a dilute aqueous solution of sulfuric acid, thereby forming acetylacetone.

2. A process for the production of 2-acetylcyclohexanone which comprises reacting cyclohexanone with cyclohexylamine, thereby forming N-(cyclohexyl) cyclohexanonimine, reacting the said N-(cyclohexyl) cyclohexanonimine with an acetylating agent, thereby forming N-(cyclohexyl) 2-acetylcyclohexanonimine, and hydrolyzing the said N-(cyclohexyl) 2-acetylcyclohexanonimine by forming 2-acetylcyclohexanone by reaction with a hydrolytic reagent comprising a dilute aqueous solution of a mineral acid.

3. A method for the preparation of isovalerylacetone from methyl isobutyl ketone which comprises reacting the said methyl isobutyl ketone with a primary amine, thereby forming an N-substituted methyl isobutyl ketimine, reacting the said N-substituted methyl isobutyl ketimine with an acetylating agent, thereby forming an N-substituted acetylmethyl isobutyl ketimine, and hydrolyzing the said N-substituted acetylmethyl isobutyl ketimine by reacting it with a dilute aqueous solution of a mineral acid.

4. A method for the production of isovalerylacetone (6-methyl-2,4-heptanedione) which comprises reacting N-(1,3-dimethylbutyl) methyl isobutyl ketimine with an acetylating agent, thereby producing N-(1,3-dimethylbutyl) acetylmethyl isobutyl ketimine, and reacting the said N-(1,3-dimethylbutyl) acetylmethyl isobutyl ketimine with a dilute aqueous solution of a mineral acid, thereby hydrolyzing the imino group and forming isovalerylacetone.

5. A process for the production of a diketone which comprises acylating an N-(alkyl) substituted ketimine wherein the carbon atom linked to the nitrogen atom by a double bond is linked by single bonds to two different hydrocarbon radicals, at least one of which is an alkyl radical, by reacting it with an acylating agent, and hydrolyzing the resulting acylated ketimine by reacting it with a hydrolytic reagent.

6. A process for the production of acetylacetone which comprises acetylating N-(phenyl) dimethyl ketimine by reacting it with an acetylating agent, and treating the resultant N-(phenyl) acetylmethyl methyl ketimine with a dilute mineral acid, thereby hydrolyzing the imine group and forming acetylacetone.

7. A process for the production of a diketone which comprises acylating an N-(aryl) substituted ketimine wherein the carbon atom linked by a double bond to the nitrogen atom is linked by single bonds to two different hydrocarbon radicals, at least one of which is an alkyl radical, by reacting it with an acylating agent, and hydrolyzing the resulting acylated ketimine by reacting it with a hydrolytic reagent.

8. A process for the production of a diketone which comprises acylating an N-(hydrocarbon)

substituted ketimine wherein the carbon atom linked by a double bond to the nitrogen atom is linked by single bonds to two different hydrocarbon radicals, at least one of which is an alkyl radical, by reacting it with an acylating agent, and hydrolyzing the resulting acylated ketimine by reacting it with a hydrolytic reagent.

9. A method for the preparation of 2-acetyl cyclohexanone which comprises reacting N-(cyclohexyl) cyclohexanonimine with an acetylating agent, thereby forming N-(cyclohexyl) 2-acetyl-cyclohexanonimine, and treating the said N-(cyclohexyl) 2-acetyl-cyclohexanoimine at a reaction temperature with dilute sulfuric acid, thereby hydrolyzing the imino group and forming 2-acetyl cyclohexanone.

10. A process for the production of a diketone which comprises acylating a ketimine wherein the carbon atom linked by a double bond to the nitrogen atom is linked by single bonds to two different hydrocarbon radicals by reacting it with an acylating agent, and hydrolyzing the resulting acylated ketimine to the corresponding diketone by reacting it with a hydrolytic reagent.

11. A process for the production of a diketone which comprises acylating a ketimine wherein the carbon atom linked by a double bond to the nitrogen atom is linked by single bonds to two different hydrocarbon radicals by reacting it with an acylating agent, and hydrolyzing the resulting acylated ketimine to the corresponding diketone by reacting it with an acid hydrolytic reagent.

12. A process for the production of a diketone which comprises acylating a ketimine wherein the carbon atom linked by a double bond to the nitrogen atom is linked by single bonds to two other carbon atoms by reacting it with an acylating agent, and hydrolyzing the resulting acylated ketimine to the corresponding diketone by reacting it with a hydrolytic reagent.

VERNON E. HAURY.
SEAVER A. BALLARD.

REFERENCES CITED

The following references are of record in the file of this patent:

Parola, Chem. Abst., vol. 29, cols. 315-316 (1935).
Passerini, Chem. Abst., vol. 23, page 2951 (1929).
Cliffe, Jour. Chem. Soc., London, 1933, pp. 1327-1331.
Snyder, Jour. Am. Chem. Soc., vol. 60, pp. 2025-2027 (1938).